(12) United States Patent
Aoki

(10) Patent No.: US 6,563,822 B1
(45) Date of Patent: May 13, 2003

(54) DATA TRANSFERRING METHOD

(75) Inventor: Takahiro Aoki, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/327,127

(22) Filed: Jun. 7, 1999

(30) Foreign Application Priority Data

Dec. 11, 1998 (JP) ............................................ 10-353442

(51) Int. Cl.⁷ ................................................ H04L 12/56
(52) U.S. Cl. ........................................ 370/390; 370/432
(58) Field of Search ................................ 370/390, 235, 370/351, 395.1, 385, 432

(56) References Cited

U.S. PATENT DOCUMENTS 5,361,256 A * 11/1994 Doeringer et al.
5,905,871 A * 5/1999 Buskens et al.
6,078,590 A * 6/2000 Farinacci et al. ............ 370/432

FOREIGN PATENT DOCUMENTS

| JP | 6-006382 | 1/1994 |
| JP | 6006382 | 1/1994 |
| JP | 9083536 | 3/1997 |
| JP | 9-083536 | 3/1997 |

* cited by examiner

Primary Examiner—Ken Vanderpuye (57) ABSTRACT

A data transferring method in which predetermined terminals within a subnet multicasts resending requests and resending data and terminals other than the predetermined terminals within the same subnet unicasts them to terminals located outside of the subnet. Moreover, destination terminals can secure required buffer quantities in accordance with a transmission rate and a service time of the data transmitted by a server, or the server can change the transmission rate based on notifications of buffer quantities by the destination terminals.

13 Claims, 12 Drawing Sheets

SN1~SN6 : SUBNET (LOCAL RESENDING CONTROL AREA)
C1~C3 : TERMINAL (CLIENT)

LOCAL RESENDING

GLOBAL RESENDING

SN1~SN6 : SUBNET (LOCAL RESENDING CONTROL AREA)
C1~C3 : TERMINAL (CLIENT)

↗↘
↔  LOCAL RESENDING

◄────► GLOBAL RESENDING

WITHOUT RATE CONTROL (WORST CASE)

FIG.15B

WITH RATE CONTROL

S1 : SERVER
C1~C4 : TERMINAL (CLIENT)

FIG.18

S1 : SERVER
C1~C4 : TERMINAL (CLIENT)

S1 : SERVER
C1~C4 : TERMINAL (CLIENT)

DATA TRANSFERRING METHOD

BACKGROUND OF THE INVENTION

1. Field of the Invention

The present invention relates to a data transferring method, and in particular to a data transferring method in case of transmitting data to a plurality of terminals over a network.

In recent years, various services have been remarkable utilizing networks such as the Internet or intranet. As an example, are taken services which utilize those networks to distribute images or voice data. In these services, users can freely access to watch the images or listen to the voice data saved in servers.

These services are usually performed by a data transferring method which is called a unicast in which data are transmitted individually, that is one to one. Also, there are services in which data are transmitted simultaneously to users, e.g. by a multicast.

Hereinafter, the operations of the unicast and the multicast will be described referring to FIGS. 17 and 18, respectively.

Figure 17:
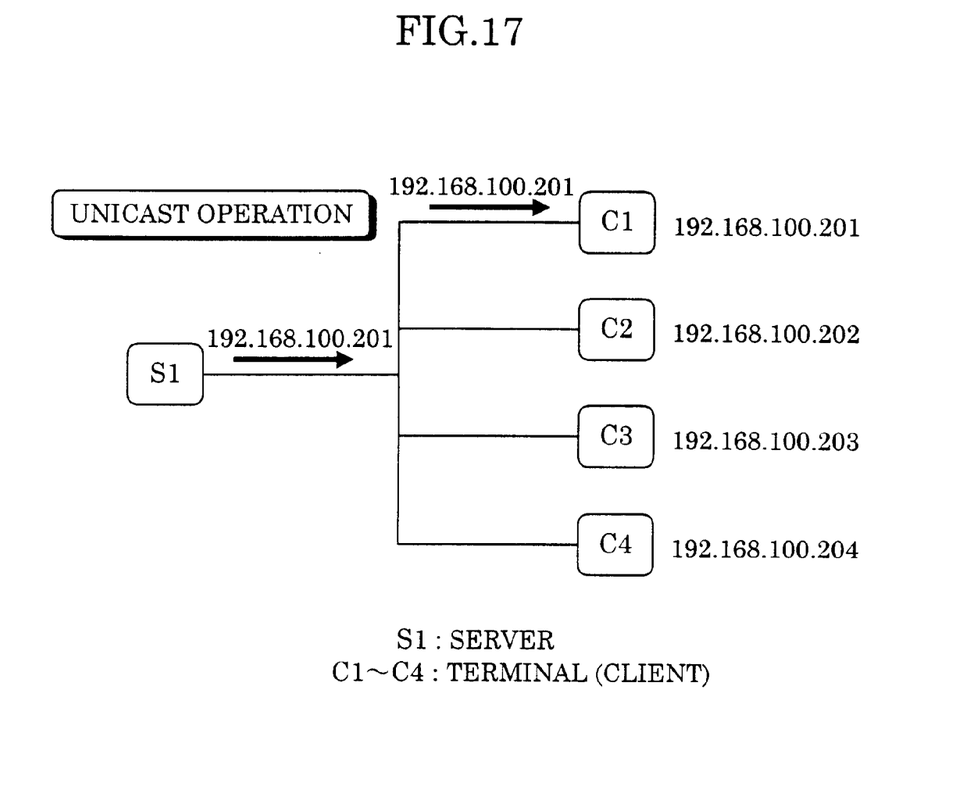
FIG. 17 is an operation diagram illustrating a general unicast method.

(1) Unicast: see FIG. 17

The data transmission is performed one to one in the unicast. Namely, as shown in FIG. 17, a server S1 which is on a transmitting side transmits data with a proper address "192.168.100.201" of a terminal C1 as a destination address. Then the data will be transmitted to the terminal C1 which is the destination.

Figure 18:
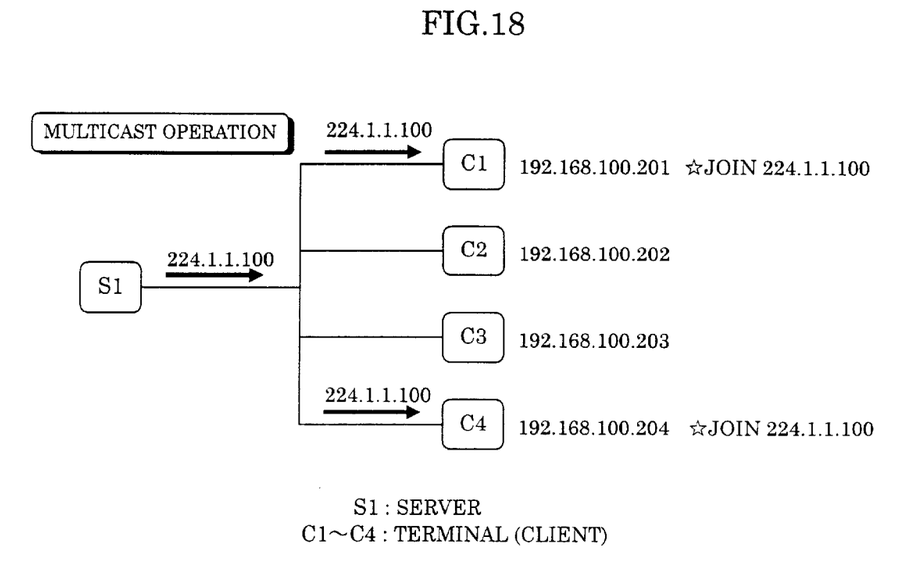
FIG. 18 is an operation diagram illustrating a general multicast method.

(2) Multicast: see FIG. 18

A multicast address is prepared for each service in the multicast. For example, an address "224.1.1.100" is prepared for sports programs. Users who wish to have this service can receive the data by joining the multicast address "224.1.1.100".

The server which is on a transmitting side only has to transmit data to the address "224.1.1.100" as in the case of unicast. Then, copies of data are made as required in the process of data transmission, so that the data are finally sent to all of the terminals (C1 and C4) which have requested to receive.

In the multicast, since the data transmission by the server can be performed once no matter how many terminals there are to receive the data, it is characterized that loads of the network and the servers are reduced.

Therefore, the multicast is expected to have a large effect upon transmitting image data, such as relaying sports, events, or lecture images in a broadcast-like service form, which give heavy loads on the network and the servers.

However, there is no mechanism for guaranteeing data arrivals in the multicast. In other words, the server transmits data one-sidedly without taking any measures even if the data get lost on the way.

Also, when there is a difference between the rate in which receiving terminals consume the images or the voice data and the transmission rate of the server, it is possible for buffers in the receiving terminals to undertow or overflow.

From this point of view, a resending control for compensating the lost data (packets) when distributing data over the network and a flow control for controlling buffers in the receiving terminals not to overflow or underflow are required.

2. Description of the Related Art (1) Prior Art Related to Resending Control Firstly, a transmitting terminal (e.g., a server) embeds sequential numbers into transmitting packets. Receiving terminals (clients) can detect lost packets by checking the sequential numbers. The receiving terminals which have detected the lost packets request the transmitting terminal to resend the data, which will be compensated by having the transmitting terminal resend the requested data.

(2) Prior Art Related to Flow Control

① Fixed Rate Control

Since the consumption rate of data is preliminarily determined for the images and the voice data, the transmitting terminal keeps sending the data at the same rate. Taking an example of 6 Mbps images data, the transmitting terminal transmits the data at the rate of 6 Mbps.

② Window Control

This is a method by which the receiving terminals notify the receipt of data as well as their remaining buffer quantities to the transmitting terminal every time the receiving terminals receive the data.

Figure 19:
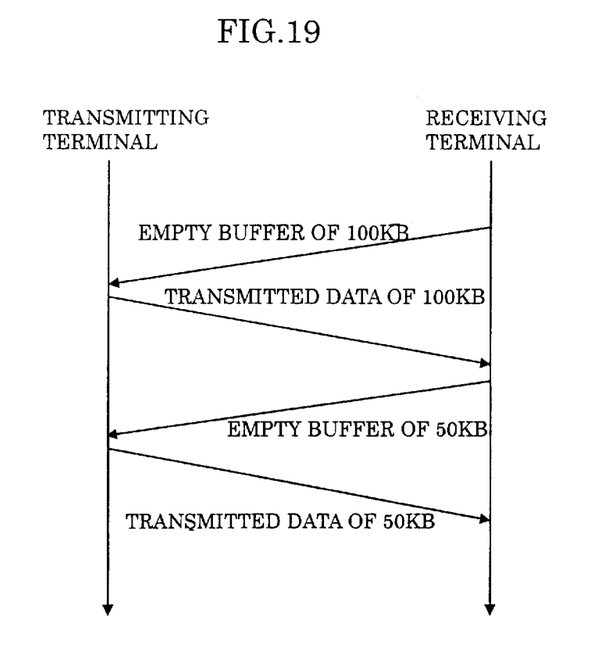
FIG. 19 is an operation diagram illustrating a flow control based on a window control in the prior art.

The transmitting terminal transmits data based on empty buffer quantities of the receiving terminals. If there is an empty buffer of 100 KB in a receiving terminal, the transmitting terminal transmits 100 KB data, which is similarly repeated as shown in FIG. 19 (a method used in TCP).

③ ACK Base Control

Figure 20:
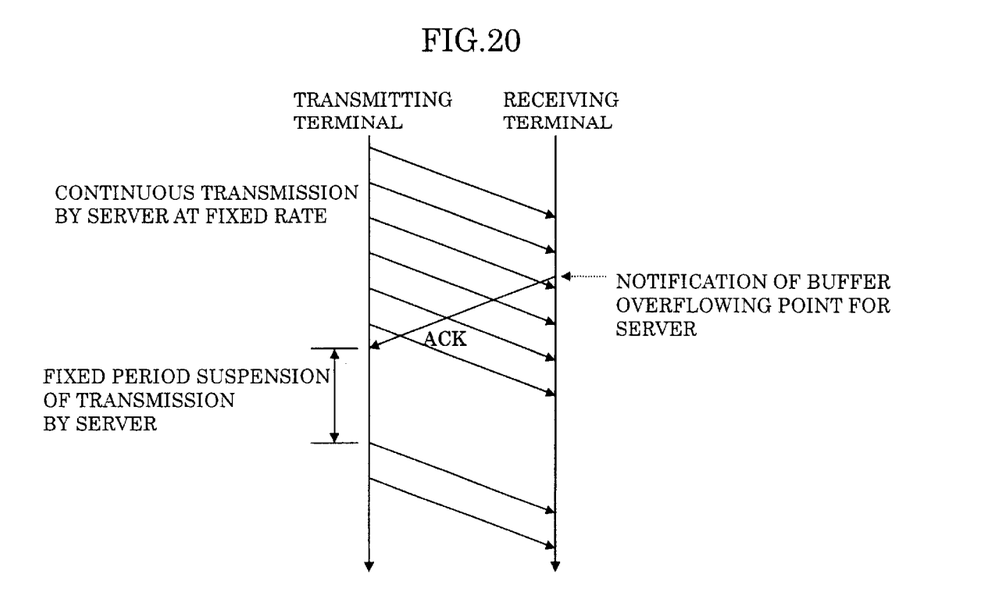
FIG. 20 is an operation diagram illustrating a flow control based on an ACK base control in the prior art.

Firstly, the transmitting terminal transmits data at a fixed rate as shown in FIG. 20. The transmission rate of the transmitting terminal is preset a little higher than the actual consumption rate of the images or the voice data. Then the data will accumulate in the buffer of the receiving terminal. When the receiving terminal detects that the buffer is about to overflow, the receiving terminal transmits a packet (ACK packet) indicating that the buffer is overflowing to the transmitting terminal. The transmitting terminal which has received this packet stops the transmission for a fixed period of time, thereby suppressing the buffer overflow in the receiving terminal.

(1) Problems Related to Resending Control

Figure 21:
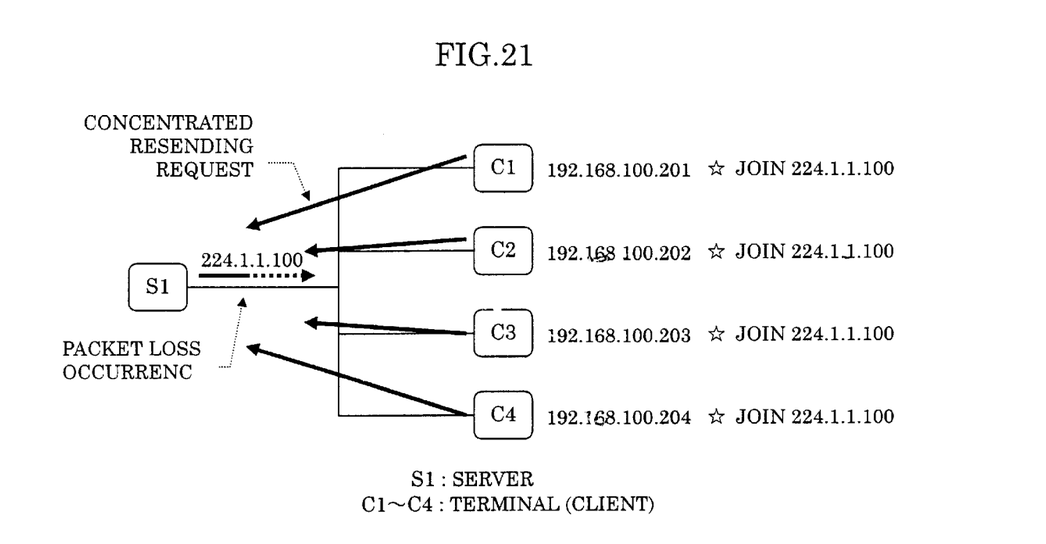
FIG. 21 is a diagram illustrating an example of packet collision in the prior art when resending is being requested.

The above-mentioned prior art of the resending control has no problem as for a unicast data transfer. However, as for the multicast, since the number of the receiving terminals cannot be specified, there is a possibility that a large number of resending request packets are generated (see FIG. 21). In this case, not only the resending process but also other data transfer processes are disabled, resulting in harmful influences over the entire network.

(2) Problems Related to Flow Control

Figure 22:
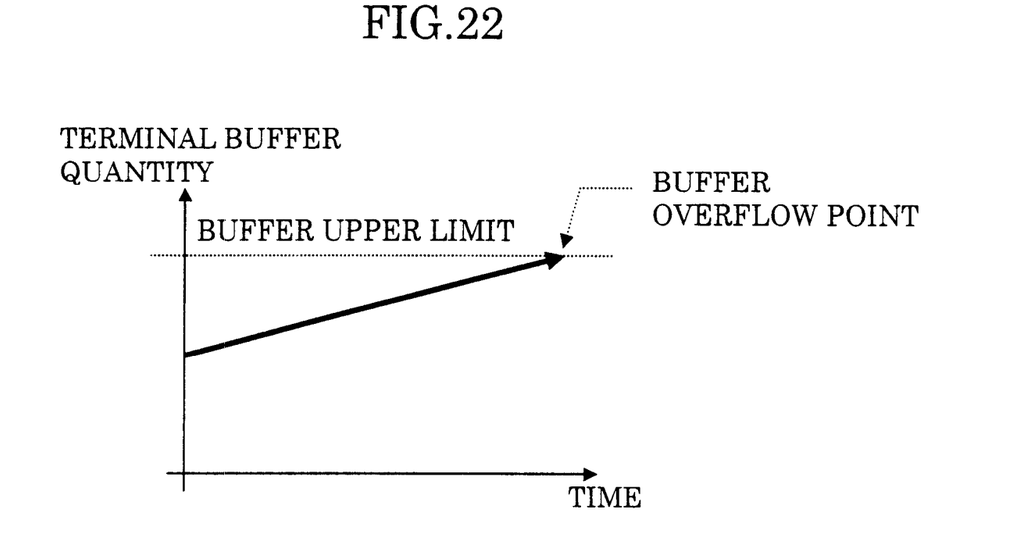
FIG. 22 is a graph illustrating a change in a buffer quantity of a terminal by unicast.
Figure 23:
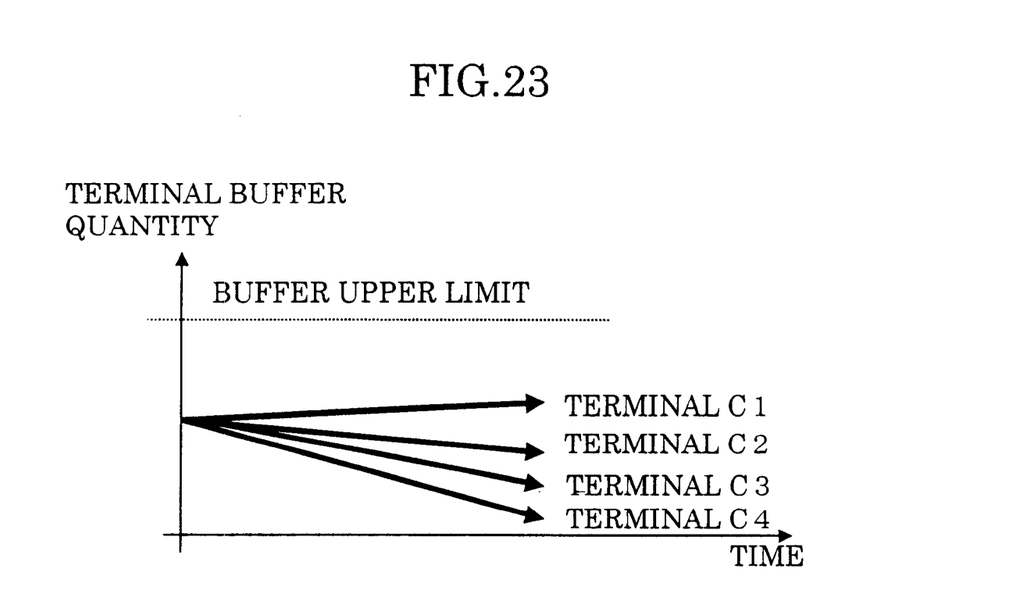
FIG. 23 is a graph illustrating changes in buffer quantities of terminals by multicast.

The problem related to the above-mentioned fixed rate control ① is that even if the transmission rate of the transmitting terminal is fixed, a buffer failure of the receiving terminal may occur in the course of the continuous transmission (see FIG. 22). This is caused by a little difference between the clock timings of the transmitting terminal and the receiving terminal. For example, the buffer failure occurs when the clock on the transmitting terminal side indicates that one hour has elapsed whereas the clock on the receiving terminal side indicate that only 59 minutes and 59 seconds have elapsed. This kind of difference occurs similarly in case of multicast for each terminal (see FIG. 23).

As for common problems between the above-mentioned window control ② and ACK base control ③, the following three points are cited:

(i) Utilization for Multicast not Being Considered

Regarding the window control ②, when different quantities of empty buffers are notified from the receiving terminals, it is difficult to determine how much data to transmit. Regarding the ACK base control ③, only the receiving terminal which has the buffer occupied finally with the largest quantity is to be controlled so that the other receiving terminals are not considered.

(ii) Weakness for Network Delay

Regarding the window control ②, unless a packet from the receiving terminal which notifies the empty space of the buffer arrives at the transmitting terminal, the transmitting terminal cannot transmit the next data. Therefore, a throughput performance decreases in a network with a large delay.

Regarding the ACK base control ③, there is a possibility in a network with a large delay that the buffers of the receiving terminals fail before the ACK packets from the receiving terminals reach the transmitting terminal to effect the stop of transmission.

Namely, both control methods ② and ③ are unsuitable for the utilization in a large-scaled network.

(iii) Increase of Transmission Packets

Regarding the window control ②, since the flow is to have the receiving terminals notify empty buffers and then to have the transmitting terminal transmit the data, there is a proportional relationship between the numbers of transmitting packets and control packets.

Regarding the ACK base control ③, although it depends on the transmission rates or the stop period after receiving the ACK packet, there is a proportional relationship between the numbers of transmitting packets and control packets.

Namely, as the number of the transmitting packets increases, the number of the control packets increases as well, resulting in plenty of packets for the flow control flowing over the network.

SUMMARY OF THE INVENTION

It is accordingly an object of the present invention to provide a data transferring method comprising a resending control step and a flow control step which reduce a load of network and avoid buffer failures at receiving terminals as much as possible.

[1] A data transferring method according to the present invention for the achievement of the above-mentioned object comprises a local resending control step for multicasting resending requests and resending data from predetermined terminals within the same subnet, and a global resending control step for unicasting resending requests and resending data from terminals other than the predetermined terminals to terminals located outside of the subnet.

Figure 1:
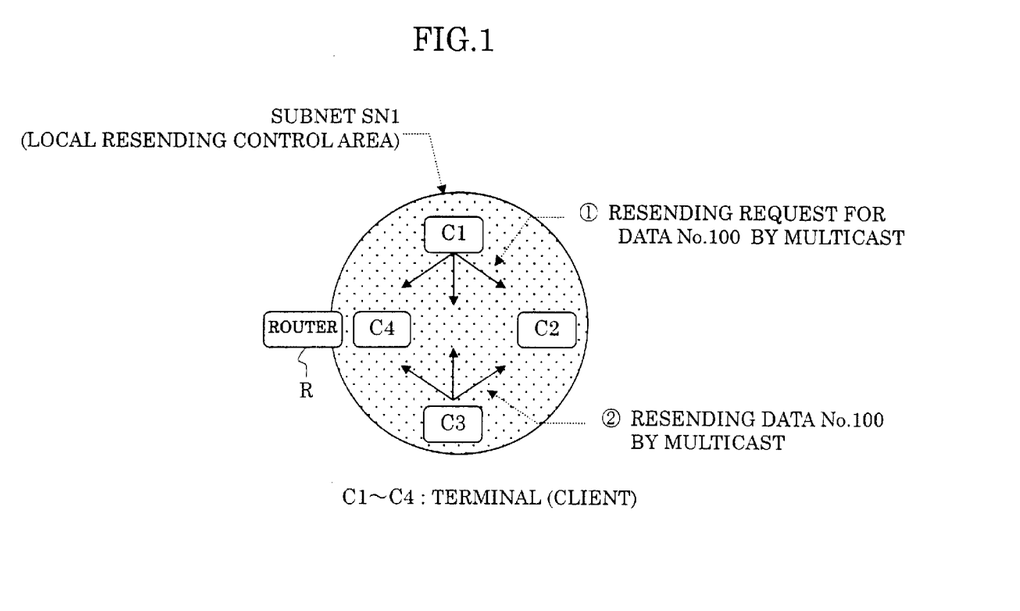
FIG. 1 is an operation diagram schematically illustrating a local resending control in a data transferring method according to the present invention.

Namely, in the local resending control step, as schematically shown in FIG. 1, when a predetermined terminal C1 within a subnet SN1 detects a packet loss in the received data, the terminal C1 transmits a resending request ① within the same subnet SN1 in the form of a multicast packet.

A terminal C3 within the subnet SN1 which receives the resending request ① and has the packet as requested resends the packet ② within the subnet SN1 by multicast.

Figure 2:
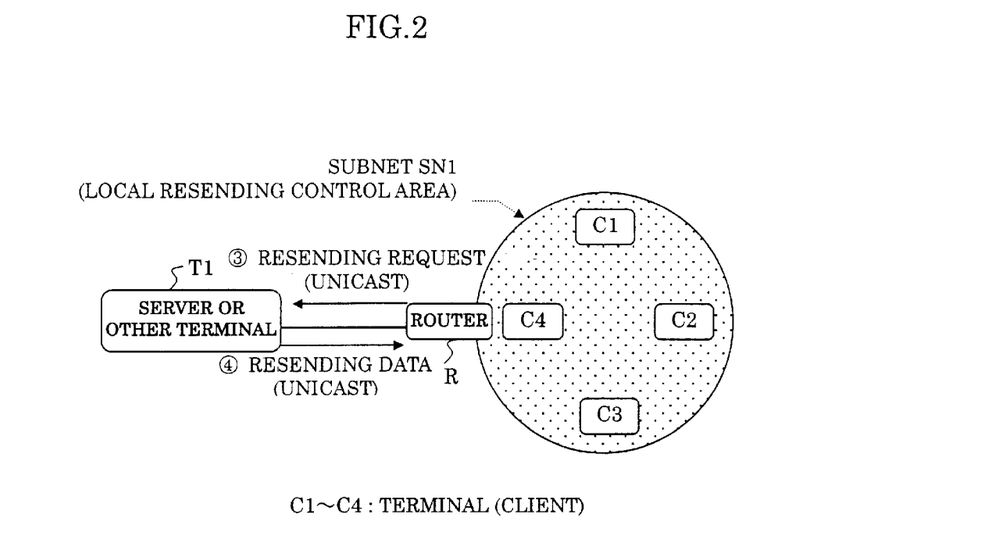
FIG. 2 is an operation diagram schematically illustrating a global resending control in a data transferring method according to the present invention.

In the global resending control step, as schematically shown in FIG. 2, a terminal C4, for example, other than the predetermined terminals within the same subnet SN1 transmits a resending request to a terminal T1 located outside of the subnet SN1. At this time, the terminal C4 establishes a connection in advance (e.g., though a router R) with the destination terminal T1 to which the resending request is transmitted. In response to a resending request ③, resending data ④ are transmitted from the destination terminal T1 by unicast.

Thus, the local resending control can restrict packet losses proper to the terminals to a limited area which is the subnet. If there are some terminals which have the same data within the subnet, the resending operation can be completed by exchanging a request packet and a resending packet within the subnet, thereby enabling a great reduction of the loads on the servers or the network.

In the global resending control step, by a unicast request of resending a packet lost in common to all of the terminals within the subnet such as a packet lost at a router, unnecessary transmisison of data to the entire network can be avoided. Also, not only a server but also a terminal located outside of the subnet can receive the global resending request as a destination, so that the loads of the servers can be reduced, enabling the application for a large-scaled network.

[2] In the above mentioned invention [1], the multicasting step may be executed under the condition that when it is detected that other terminals within the same subnet have transmitted at least one of the resending requests and the resending data, the predetermined terminals stop the transmission of at least one of the resending requests and the resending data.

Namely, the number of transferring packets can be suppressed by performing the local resending control by multicast under a predetermined condition that the terminals stop the transmission when it is detected that another terminal within the subnet has transmitted the resending request or the resending data in advance.

[3] In the above mentioned invention [1], the unicasting step may be executed with a connection established fixedly in advance.

Namely, by this method, regardless of the presence of the data to be transmitted, the terminal which transmits resending requests and the terminal which receives the resending request mutually inform of their own addresses in advance whereby the connection is always established. This is effective in the case where the network configuration does not change.

Thus, by always establishing the connection, an immediate resending control can be performed as required without taking time to establish the connection.

[4] In the above mentioned invention [1], an address of a connection used for the unicasting step may be different from an address used for data transmission.

This is effective when the connection is dynamically established between the terminal which transmits the resending request and the terminal which receives the resending request. In this case, the terminal which receives the resending request transmits, for example, a packet for inviting a connection to the network by multicast. Any terminal wishing to establish a connection can establish the connection by applying for the connection inviting packet.

In case the invitation and the application for the connection are performed by using the address used for the data transmission, if data other than the connection inviting packet are being transmitted (from server and the like) to the address used for the data transmission at the time when the terminal wishing to establish the connection tries to receive the connection inviting packet with the address used for the data transmission, the terminal will receive those data. Namely, there is a possibility that the terminal even receives unnecessary data.

Therefore, by using different addresses for the connection control and for the data transmission, such unnecessary data can be prevented from being transmitted to the terminal.

[5] In the above mentioned invention [1], the terminals located outside of the subnet may comprise servers.

[6] In the above mentioned invention [5], the method may further comprise a flow control step for destination terminals to secure necessary buffer quantities according to transmission rates and service times of data transmitted by the servers. (This method is hereinafter occasionally referred to as "variable buffer method".)

Figure 3:
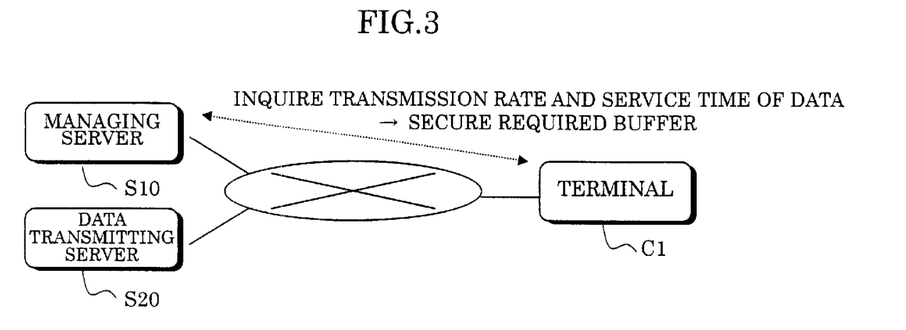
FIG. 3 is a diagram schematically illustrating a variable buffer method for flow control in a data transferring method according to the present invention.

Namely, each terminal inquires the server of rates and the service times of the transmitting data before starting the service as shown in FIG. 3. Each terminal avoids a buffer failure by considering an expected clock difference which is recognized by its own terminal in addition to the rates and the service times of the transmitting data to calculate and secure the required buffer quantity.

For example, it is assumed that the clock difference is ±100 ppm. In order to reproduce the images which have a data rate of 6 Mbps for two hours, the required buffer quantity is given by:

$$2 \times \underbrace{100 \times 10^{-6}}_{\uparrow\ 100\ \text{ppm}} \times \underbrace{6 \times 10^{6}}_{\uparrow\ 6\ \text{Mbps}} \times \underbrace{2 \times 60 \times 60}_{\uparrow\ 2\ \text{hours}} \div 8 = 1080000 \text{ (bytes)}$$

Thus, the required buffer quantity can be determined if the expected clock difference, the data rate, and the reproduction time are given. Since each terminal secures the above-mentioned buffer quantity, useless buffers can be removed, thereby enabling an efficient utilization of memories.

[7] In the above mentioned invention [5], the method may further comprise a flow control step wherein the servers change transmission rates based on notifications of buffer quantities from destination terminals. (This method is hereinafter occasionally referred to as "variable transmission rate method".)

Figure 4:
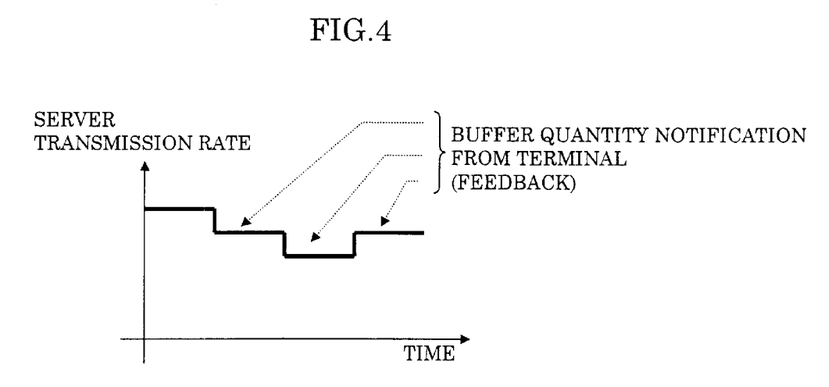
FIG. 4 is a schematic diagram (1) of a variable transmission rate method for flow control in a data transferring method according to the present invention.

Namely, while transmitting the data at a fixed rate (e.g., 6 Mbps), the server periodically inquires the terminals of the buffer states to change the transmission rate based on the buffer quantity notifications from the terminals (see FIG. 4). This rate determination procedure will now be described by illustrating the case of unicast referring to FIG. 5.

Figure 5:
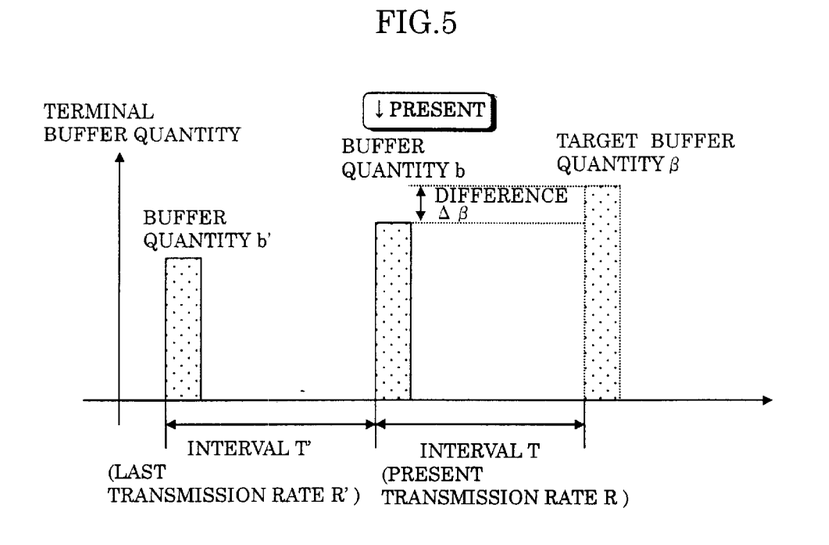
FIG. 5 is a schematic diagram (2) of a variable transmission rate method for flow control in a data transferring method according to the present invention.

Buffer quantities measured before and after an interval T' are supposed to be b' and b, respectively. Also, a transmission rate during the interval is supposed to be R' and a target buffer quantity is supposed to be β A difference between the current buffer quantity b and the target buffer quantity β is defined as Δβ(=β−b). A transmission rate R during the next interval T is determined by the following equation:

$$R = R' + p\underbrace{\frac{\Delta \beta}{T}}_{\uparrow\ \text{1st member}} - q\underbrace{\frac{(b-b')}{T'}}_{\uparrow\ \text{2nd member}} \qquad \text{Eq. (1)}$$

where p and q are arbitrary parameters which take values between 0 and 1. The first member of Eq. (1) is an item for making the buffer approach the target value. In other words, since the difference between the target buffer quantity and the present buffer quantity is Δβ, an item Δβ/T indicates a rate required for filling the difference Δβ within the next T seconds. On the other hand, the second member indicates a power for stabilizing the buffer. Since the buffer has changed from b' to b in T' seconds, only (b−b')/T' can be subtracted from the rate in order to cancel the change.

It is to be noted that the characteristic of the rate correction can be changed by varying p and q. When p is large, the convergence to the target value becomes fast, however the stability of the rate is correspondingly weakened. When q is large, the buffer is stabilized, however the convergence to the target value takes time. Therefore, p and q are determined in accordance with the environment to be utilized.

[8] In the above mentioned invention [7], the flow control step may include a step for the servers to multicast requests for notification of buffer quantities and for each terminal to unicast the notification.

Namely, when the server transmits data by multicast, the server requests all of the object terminals by multicast to notify the buffer quantities. The terminals notify the buffer quantities in response to the requests. At this time, the load of the network can be reduced by unicasting the notification.

It is to be noted that when multicasting the notification requests to the terminals, the server adjusts the rate in the above-mentioned invention [7] by taking the proportion of the transmission data occupying the total buffer of the terminals as the target for rate setting.

Figure 6:
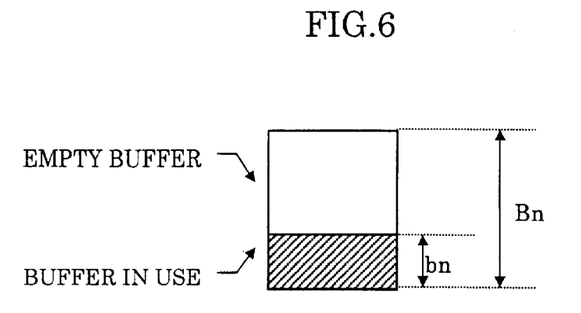
FIG. 6 is a diagram schematically illustrating a buffer quantity of a terminal in a data transferring method according to the present invention.

It is supposed that a notified total buffer quantity of the n-th terminal is $B_n$ and the amount of data within the buffer is $b_n$ (see FIG. 6). Also, the buffer quantity of the terminal is supposed to have increased by Δβ depending on the transmission rate of the server. The average buffer usage rate w at this point can be expressed as follows:

$$w = \frac{1}{N} \sum_{n=1}^{N} \frac{(b_n + \Delta \beta)}{B_n} = \frac{1}{N}\left[\Delta \beta \sum_{n=1}^{N} \frac{1}{B_n} + \sum_{n=1}^{N} \frac{b_n}{B_n}\right] \qquad \text{Eq. (2)}$$

From Eq. (2) above, Δβ can be given by the following equation.

$$\Delta \beta = \frac{\left[wN - \sum_{n=1}^{N} \frac{b_n}{B_n}\right]}{\sum_{n=1}^{N} \frac{1}{B_n}} \qquad \text{Eq. (3)}$$

For example, it should be set that w=0.5 in order to adjust the rate so that the buffers of the terminals may be half filled.

Δβ is calculated from Eq. (3) and the transmission rate is calculated from Eq. (1), based on the notifications from the terminals.

[9] [10] In the above mentioned invention [6] or [8], the flow control step may include a step for dividing the destination terminals into groups according to the buffer quantities, one group of the terminals tending to overflow, the other group of the terminals tending to underflow, and for transmitting the data with a plurality of transmission rates suitable respectively for the groups.

Namely, in the variable transmission rate method, the server divides the terminals into two groups according to the buffer quantities notified by the destination terminals; one group of the terminals tending to overflow; the other group of the terminals tending to underflow. Then the server separately multicasts the transmitting data to each group of the terminals at the transmission rate corresponding to the average buffer quantity of each group.

Moreover, in the variable buffer method, the data transmission is performed by using a new transmission rate when it becomes necessary to perform services longer in time than expected.

Although the loads of the servers and the network increase with a plurality of transmission rates, the time before the buffer failures occur in the destination terminals can be extended.

[11] In the above mentioned invention [5], the method may further comprise a flow control step for the destination terminals which receive the data from the servers to synchronize their own clocks with the clocks of the servers (clock synchronization method).

Namely, this invention resides in adjusting the clock timings of the terminals to those of the server. The server sends a "synchronization packet" to the object terminals at certain intervals which may not necessarily be fixed. The present time of the server itself (or the elapsed time after the initiation) is embedded into this packet. It is alternatively possible to embed the time of the server in the data packets.

Figure 7:
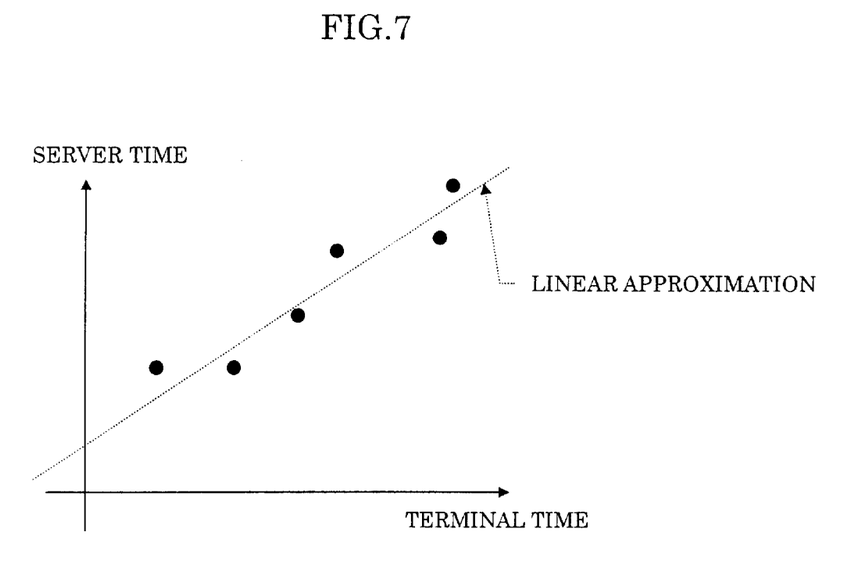
FIG. 7 is a graph illustrating a relationship between a server time and a terminal time in a data transferring method according to the present invention.

The terminals which have received this packet record the times of their own when they did so as well as the time of the server itself (or the elapsed time after the initiation). This operation can be repeated several times and plotted as shown in FIG. 7.

A linear approximation of these plots can be obtained by applying the least squares method or the like, as follows:

$$Ts=aTc+b \qquad \text{Eq. (4)}$$

where Ts is the time of the server and Tc is the time of terminals. "a" in the above equation indicates how different the clocks of the server and the terminal gain.

When the images or the voice data are decoded on the terminal side, the time given by the above-mentioned Eq. (4) according to the time received from the server is determinded for use.

[12] In the above mentioned invention [11], the flow control step may include a step for destination terminals to preliminarily synchronize the clocks before services.

Namely, the server transmits the above-mentioned "synchronization packet" irrespective of the presence of the service, whereby the terminals can preliminarily synchronize the clocks before the initiation of the service. As a result, the clock differences immediately after the initiation of the service become small.

[13] In the above mentioned invention [12], the step for preliminarily synchronizing the clocks may include a step for the servers to notify a time notification packet from the same servers to the destination terminals using an address different from data transmission address.

Namely, the server transmits the above-mentioned "synchronization packet" by using the address different from the data transmission address. As a result, superfluous data can be prevented from being transmitted to terminals or a network which are out of the service.

BRIEF DESCRIPTION OF THE DRAWINGS

Throughout the figures, the same reference numerals indicate identical or corresponding portions.

DESCRIPTION OF THE EMBODIMENTS (1) Embodiment Related to Resending Control

Figure 8:
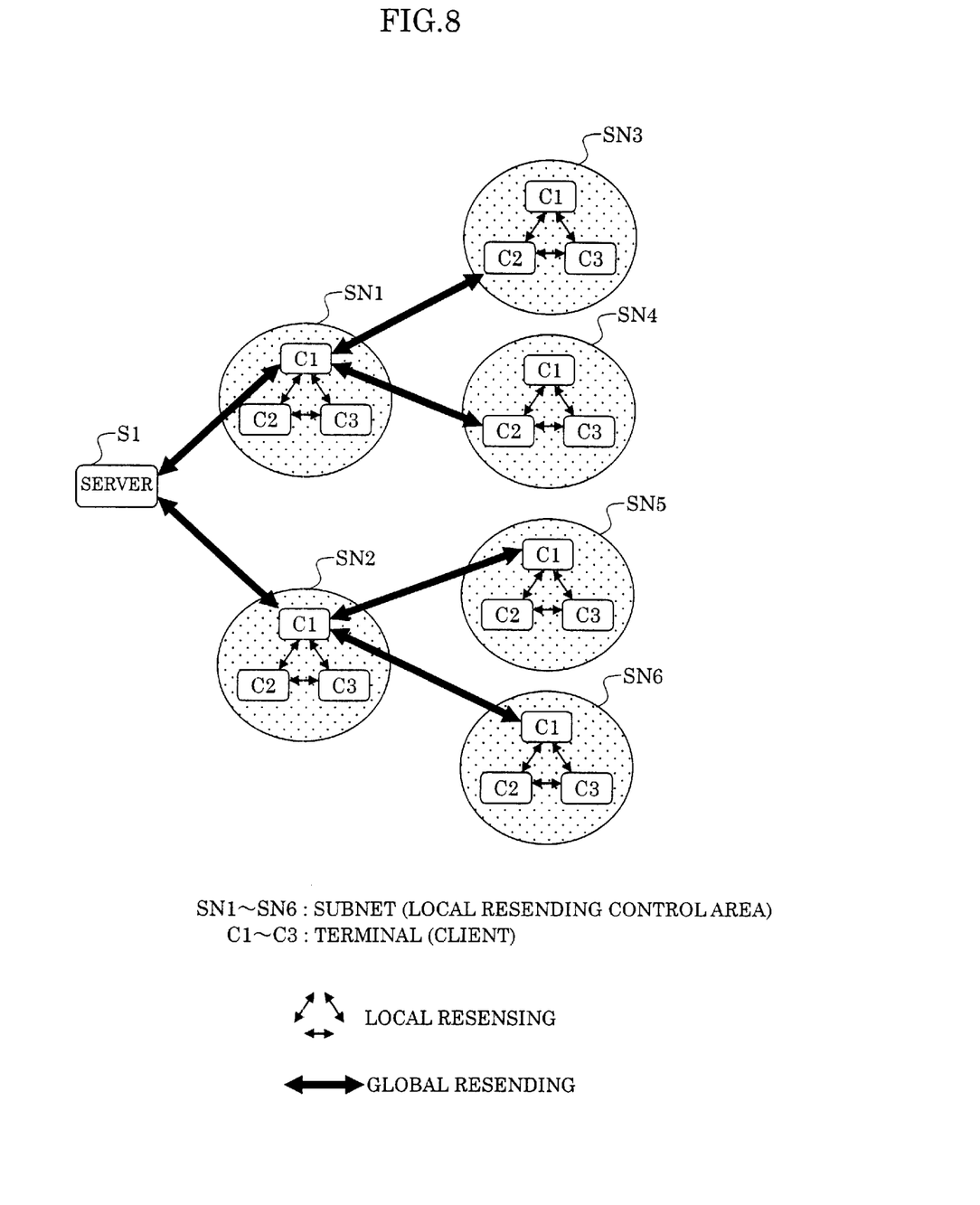
FIG. 8 is a block diagram schematically illustrating a system configuration of a resending control in a data transferring method according to the present invention.

The operations of a resending control in a data transferring method according to the present invention will be described herebelow referring to a system configuration example shown in FIG. 8. It is to be noted that FIG. 8 illustrates the resending control in a network where a local resending control and a global resending control are combined. Also, a server S1 is assumed to transmit data by multicast to terminals (clients) C1–C3 which respectively comprise subnets SN1–SN6 as shown in FIG. 8.

Firstly, it is preset that predetermined terminals can perform the local resending control within each of the subnets SN1–SN6. For example, the terminals C2 and C3 in the subnets SN1, SN2, SN5, and SN6, and the terminals C1 and C3 in the subnets SN3 and SN4 can perform the local control. It is also preset that these terminals transmit resending requests and resending data by multicast when they detect lost packets.

Moreover, it is preset that terminals other than the above-mentioned predetermined terminals within each subnet can perform the global resending control. For example, it is preset that the terminals C1 in the subnets SN1, SN2, SN5, and SN6 and the terminals C2 in the subnet SN3 and SN4 can perform the global resending control, so that when detecting lost packets, these terminals transmit the resending requests and the resending data by unicast to the terminals (including the servers) located outside of the subnet.

In the local resending control, when the terminal C2 in the subnet SN1, for example, detects the loss of data No. 100, the terminal C2 transmits the resending request for the data by multicast to the terminals C1 and C3 in the subnet SN1. However, if the terminal C3 having detected the loss of the same data No. 100 has transmitted the resending request earlier than the terminal C2, the resending request by the terminal C3 has already been transmitted by multicast and therefore the terminal C2 can detect that the resending request for the data No. 100 has been made and refrains from transmitting the same resending request from its own terminal. Similarly, the repeated transmissions of the same resending data can be avoided.

On the other hand, in the global resending control; when the terminal C1 in the subnet SN1, for example, detects a packet loss, the terminal C1 makes a global resending request to the server S1 to which a fixed connection is established beforehand. In response thereto, the server S1 transmits the data to the terminal C1.

Figure 9:
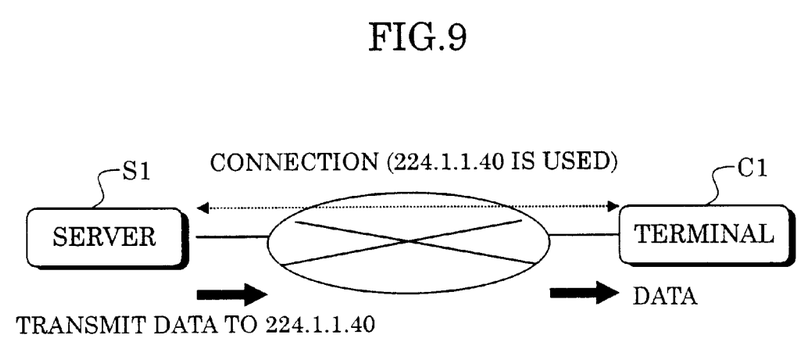
FIG. 9 is an operation diagram schematically illustrating a case using the same address for a connection control and for a data transmission to perform a global resending control in a data transferring method according to the present invention.

It is also possible that the terminal which transmits the resending request and the terminal which receives the resending request establish a connection therebetween dynamically, not fixedly. In this case, if the same address "224.1.1.40" is used for the connection control and for the data transmission as shown in FIG. 9, there is a possibility that the data are to be transmitted to even a terminal which is out of the service but is joining the address "224.1.1.40" in order to establish the connection.

Figure 10:
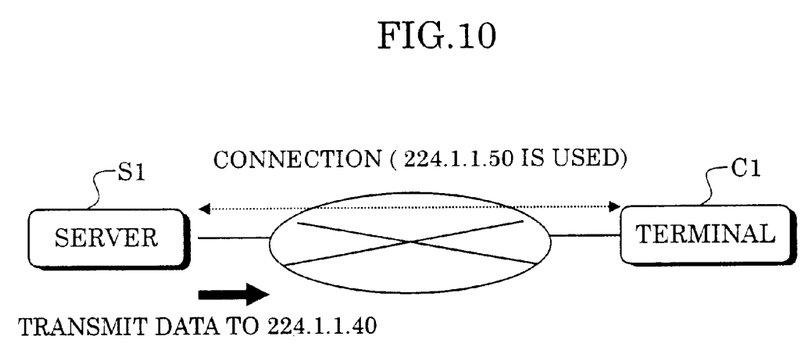
FIG. 10 is an operation diagram schematically illustrating a case using different addresses for a connection control and for a data transmission to perform a global resending control in a data transferring method according to the present invention.

Therefore, it is preferable to use different addresses for the connection control and for the data transmission as shown in FIG. 10. An address "224.1.1.50" is used for the connection control and the address "224.1.1.40" is used for the data transmission in this example. Although the terminal which is out of the service is joining the address "224.1.1.50", the data are not transmitted since the terminal is not joining the address "224.1.1.40" for the data transmission.

(2) Embodiment Related to Flow Control

Figure 11:
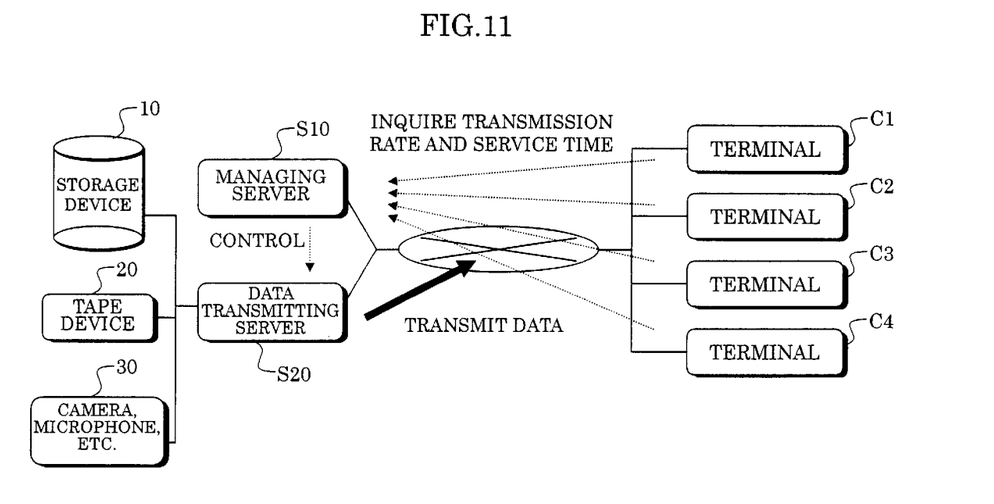
FIG. 11 is a block diagram illustrating a system configuration of a flow control in a data transferring method according to the present invention.

FIG. 11 illustrates a system configuration example of a flow control in a data transferring method according to the present invention. A managing server S10 controls a data transmission server S20 to which a storage device 10, a tape device 20, and a camera, microphone, and the like 30 are connected so that the data transmission at a predetermined transmission rate and service time may be performed. Then, after inquiring the managing server S10 of the transmission rate of the data and the service time, and securing a necessary buffer quantity based thereon, the terminals C1–C4 (clients) come into service.

Figure 12:
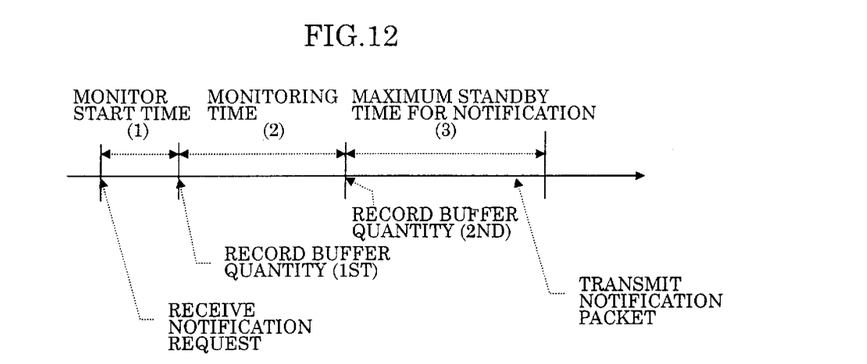
FIG. 12 is a timing chart illustrating a notification of buffer quantity for flow control in a data transferring method according to the present invention.

On the other hand, the status of the buffer quantity may be requested of each terminal from the server in the flow control of the data transferring method according to the present invention. The procedure in this case is shown in FIG. 12.

Firstly, there is a possibility that notification packets mutually collide within the network in a multicast environment since destination terminals are unspecified. In order to avoid this, the terminals can notify their own buffer quantities of each other at random times.

Specifically, the server transmits a buffer quantity notification request packet which includes the information of a monitor start time (1), a monitoring time (2), and a maximum standby time for notification (3). Each terminal records the buffer quantity for the first time when the monitor start time (1) passes after receiving the buffer quantity notification request packet. This corresponds to b' in Eq. (1). After the monitoring time (2) passes, the terminal records the buffer quantity for the second time. This corresponds to b in Eq. (1). Then, the terminal transmits a buffer quantity notification packet after standing by for a time from 0 to the lapse of the maximum standby time for notification (3).

The server calculates the transmission rate in order to obtain the target buffer quantity by using Eqs. (3) and (1) based on the contents of the buffer quantity notification packets received from the terminals and then changes the transmission rate.

Figure 13:
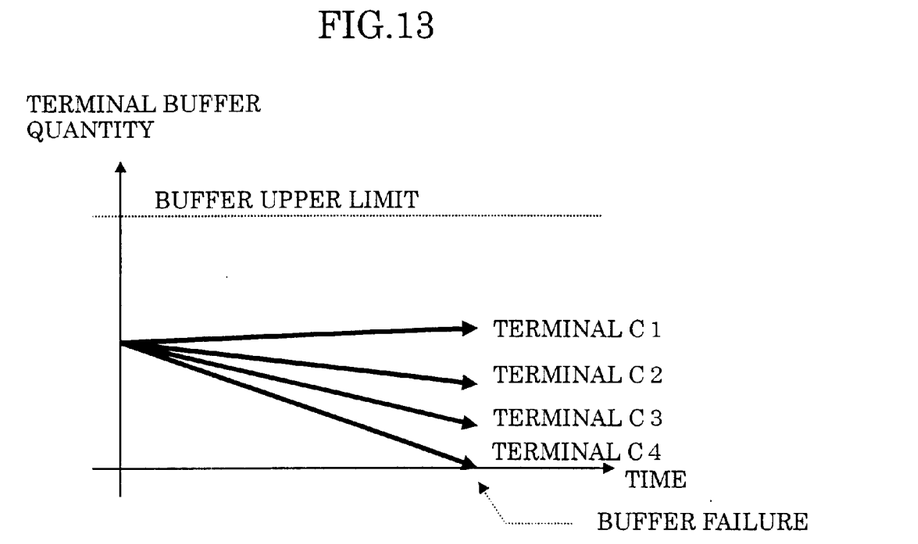
FIG. 13 is a graph illustrating transitions of buffer quantities for terminals in a case without a rate control.
Figure 14:
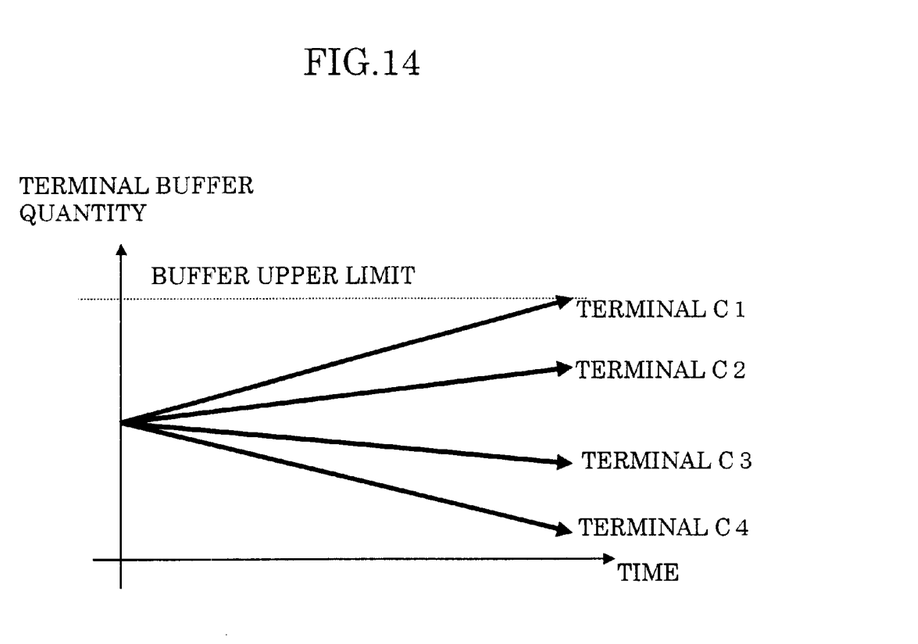
FIG. 14 is a graph illustrating transitions of buffer quantities for terminals in a case with a rate control based on a flow control in a data transferring method according to the present invention.

It is to be noted that FIG. 13 illustrates the transitions of the buffer quantities of the terminals C1–C4 by a graph when the server does not control the transmission rate of the data and that FIG. 14 illustrates those when the server controls the transmission rate based on the notifications of the buffer quantities from the terminals C1–C4.

By comparing FIG. 13 with FIG. 14, it is found that the time to reach the buffer upper limit indicating the buffer failures can be made longer in FIG. 4 where the transmission rate is controlled, rather than in FIG. 13.

Figure 15A:
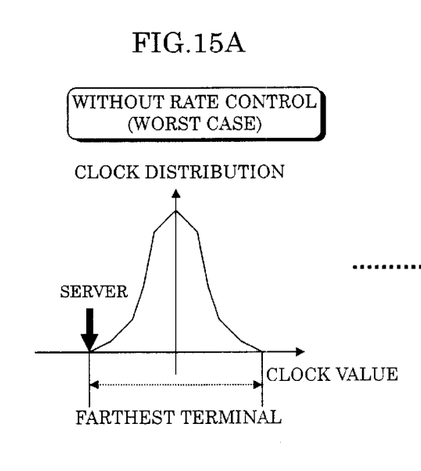
FIGS. 15A and 15B are graphs for explaining effects of a rate control based on a flow control in a data transferring method according to the present invention.
Figure 15B:
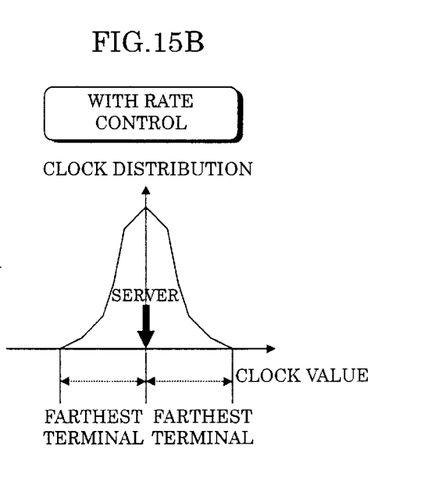

Also, on the assumption that the differences of the clocks of the server and the terminals are regularly distributed, by comparing FIG. 15A without any control of the transmission rate with FIG. 15B with a controlled transmission rate, the effect of the differences of the clocks in the worst case being halved can be achieved by the server controlling the transmission rate based on the notifications of buffer quantities from the terminals.

Figure 16A:
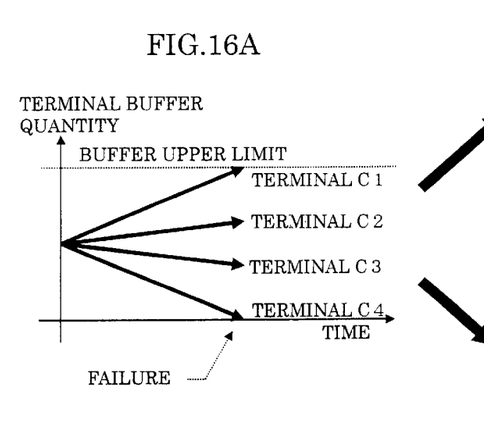
FIGS. 16A–16C are graphs for explaining a grouping based on a flow control in a data transferring method according to the present invention.
Figure 16B:
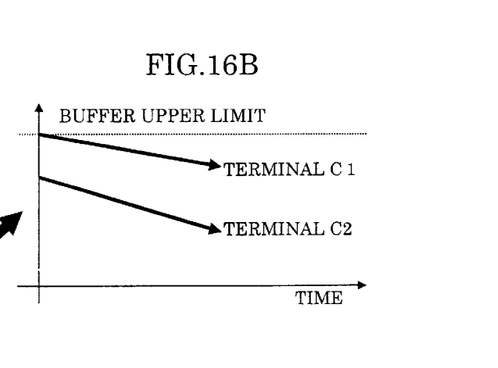
Figure 16C:
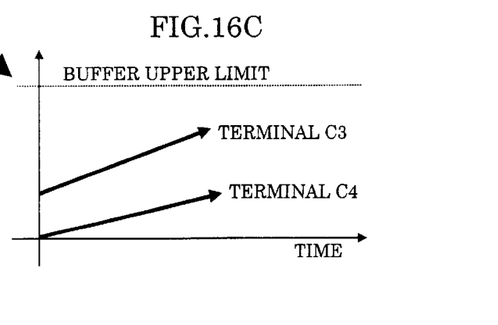

However, even if the above-mentioned flow control is performed, as the service continues, differences between the buffer quantities of the terminals become obvious as shown in FIG. 16A. Accordingly, the terminals may be divided into a group of terminals tending to overflow (terminals C1 and C2) (see FIG. 16B) and another group of terminals tending to underflow (terminals C3 and C4) (see FIG. 16C) before the failures of buffer occur so that the server may transmit the data at transmission rates suitable for each group.

As described above, a data transferring method according to the present invention is arranged such that predetermined terminals within the same subnet multicasts resending requests and resending data and terminals other than the predetermined terminals within the same subnet unicasts them to terminals located outside of the subnet so that loads of servers or a network can be greatly reduced. Moreover, destination terminals can secure required buffer quantities in accordance with a transmission rate and a service time of the data transmitted by the server or the server can perform a flow control for changing the transmission rate based on notifications of buffer quantities from the destination terminals, whereby buffer failures can be prevented as much as possible.

What we claim is:

1. A data transferring method comprising:
    a local resending control step for multicasting resending requests and resending data from predetermined terminals within the same subnet, respectively when the predetermined terminals detect that resending data is required and when the predetermined terminals receive resending requests from any of the predetermined terminals; and a global resending control step for unicasting resending requests and resending data from terminals other than the predetermined terminals to terminals located outside of the subnet, respectively when the terminals other than the predetermined terminals detect that resending data is required and when the terminals other than the predetermined terminals receive resending requests from any of the terminals located outside of the subnet.

2. The data transferring method as claimed in claim 1 wherein the multicasting step is executed under the condition that when it is detected that other terminals within, the same sublet have transmitted at least one of the resending requests and the resending data, the predetermined terminals stop the transmission of at least one of the resending requests and the resending data.

3. The data transferring method as claimed in claim 1 wherein the unicasting step is executed with a connection established fixedly in advance.

4. The data transferring method as claimed in claim 1 wherein an address of a connection used for the unicasting step is different from an address used for data transmission.

5. The data transferring method as claimed in claim 1 wherein the terminals located outside of the subnet comprise servers.

6. The data transferring method as claimed in claim 5 further comprising a flow control step for destination terminals to secure necessary buffer quantities according to transmission rates and service times of data transmitted by the servers.

7. The data transferring method as claimed in claim 5 further comprising a flow control step wherein the servers change transmission rates based on notifications of buffer quantities from destination terminals.

8. The data transferring method as claimed in claim 7 wherein the flow control step includes a step for the servers to multicast requests for notification of buffer quantities and for each terminal to unicast the notification.

9. The data transferring method as claimed in claim 6 wherein the flow control step includes a step for dividing the destination terminals into groups according to the buffer quantities, one group of the terminals tending to overflow, the other group of the terminals tending to underflow, and for transmitting the data with a plurality of transmission rates suitable respectively for the groups.

10. The data transferring method as claimed in claim 8 wherein the flow control step includes a step for dividing the destination terminals into groups according to the buffer quantities, one group of the terminals tending to overflow, the other group of the terminals tending to underflow, and for transmitting the data with a plurality of transmission rates suitable respectively for the groups.

11. The data transferring method as claimed in claim 5 further comprising a flow control step for the destination terminals which receive the data from the servers to synchronize their own clocks with the clocks of the servers.

12. The data transferring method as claimed in claim 11 wherein the flow control step includes a step for the destination terminals to preliminarily synchronize the clocks before services.

13. The data transferring method as claimed in claim 12 wherein the step for preliminarily synchronizing the clocks includes a step for the servers to notify a time notification packet from the same servers to the destination terminals using an address different from data transmission address.

* * * * *